United States Patent [19]

Frigo

[11] Patent Number: 4,776,700
[45] Date of Patent: Oct. 11, 1988

[54] SWITCHED STATE FIBER OPTIC GYROSCOPE

[75] Inventor: Nicholas J. Frigo, Arlington, Va.

[73] Assignee: The United States of America as represented by the Secretary of the Navy, Washington, D.C.

[21] Appl. No.: 102,704

[22] Filed: Sep. 30, 1987

[51] Int. Cl.[4] .................... G01B 9/02; G01C 19/64
[52] U.S. Cl. .................................................. 356/350
[58] Field of Search ............................. 356/345, 350

[56] References Cited

FOREIGN PATENT DOCUMENTS 61-240116 10/1986 Japan .................................. 356/350

OTHER PUBLICATIONS

Publication, A Constant Accuracy, High Dynamic Range Fiber Optic Gyroscope, by N. J. Frigo, SPIE, vol. 719, Fiber Optic Gyros, (10th Anniversary Conference held in Cambridge, Mass.), Sep. 24–26, 1986, pp. 155–159.

Publication, An Amplitude Switched Fiber Optic Gyroscope, by N. J. Frigo, OF S '86, Tokyo, (Proceedings of Fourth International Conference on Optic Fiber Sensors-Conference held in Tokyo, Japan), Oct. 7–9, 1986, four pages.

Publication, Signal Processing Schemes for the Fiber-Optic Gyroscope, by K. Böhm et al., SPIE, vol. 719, Fiber Optic Gyros, (10th Anniversary Conference held in Cambridge, Mass.), Sep. 24–26, 1986, pp. 36–44.

Publication, Fibre Optic Gyro with Digital Data Acquisition and Control System, by K. Böhm et al., Symposium Gyro Technology, Stuttgart, Germany (DGON), (1983), preprint of subsequently printed article, pp. 4.0–4.11.

Publication, Comparative Sensitivity and Noise Investigations On Fiber Gyros Of Various Optical Configurations, by K. U. Baron et al., Symposium Gyro Technology, Stuttgart, Germany (DGON), (1983), preprint of subsequently printed article—pp. 3.0–3.15.

Publication, Direct Rotation-Rate Detection with a Fibre-Optic Gyro by Using Digital Data Processing, by K. Böhm et al., 19 Electronics Letters 997–999, (1983).

*Primary Examiner*—Vincent P. McGraw
*Attorney, Agent, or Firm*—Thomas E. McDonnell; George Jameson

[57] ABSTRACT

An improved fiber optic gyroscope with a substantial improvement in dynamic range and scale factor stability over a basic fiber optic gyroscope is disclosed. In a preferred embodiment of the invention the detected output of the gyroscope is demodulated to yield first and second voltage levels respectively proportional to preselected sine and cosine components of the detected output. These first and second voltage levels are respectively switched between a feedback network which stabilizes the drive level and a rate sensing circuit which senses the rotation rate. Such switching occurs when operational states are switched in order to stabilize the drive level from the feedback network and to provide the most sensitive one of the first and second voltage levels to the rate sensing network.

8 Claims, 4 Drawing Sheets

TABLE 1

| $\phi_s$ | $\phi_{LSB}$ (Where $\phi_{LSB}=\sin^{-1}\frac{V(\omega)}{p/p}$ in STATE 1) | $\phi_{LSB}$ (Where $\phi_{LSB}=\sin^{-1}\frac{V(2\omega)}{p/p}$ In STATE 2) | LOGIC SIGNS FOR 75 | LOGIC SIGNS FOR 67 | $\phi_{MSB}$ | RATE WORD ($\Omega$) |
|---|---|---|---|---|---|---|
| −45° to +45° | −45° to +45° | | + | + | 0° | $\phi_{MSB} + \phi_{LSB}$ |
| +45° to +135° | | +45° to −45° | − | + | 90° | $\phi_{MSB} - \phi_{LSB}$ |
| +135° to +225° | +45° to −45° | | − | − | 180° | $\phi_{MSB} - \phi_{LSB}$ |
| +225° to +315° | | −45° to +45° | + | − | 270° | $\phi_{MSB} + \phi_{LSB}$ |
| +315° to +405° | −45° to +45° | | + | + | 360° | $\phi_{MSB} + \phi_{LSB}$ |

FIG. 5

SWITCHED STATE FIBER OPTIC GYROSCOPE

BACKGROUND OF THE INVENTION

The present invention relates to fiber optic gyroscopes and particularly to a constant accuracy, high dynamic range fiber optic gyroscope.

The Sagnac phase shift between two counterpropagating beams is the basis for all optical gyroscopes, although it is detected in a variety of ways. In the ring laser gyroscope and various "closed loop" optical gyroscopes, the scale factor (e.g. counts per unit rotation rate) is fixed by the area of the optical medium, whereas the phase reading fiber optic gyroscope (FOG) has a scale factor which increases with increasing length of optical fiber. Thus, development of low-loss fibers holds the possibility of extremely sensitive gyroscope operation, and has made the FOG a competitive optical gyroscope. Although most of the first decade of FOG development has concentrated on improving sensitivity, attention is now turning to other difficulties associated with the FOG.

Principal among the difficulties associated with the FOG are the "scale factor" and the "dynamic range" problems. The scale factor problem refers to the fact that the electrical output of the fiber optic gyroscope is not always the same for a given input rotation. The dynamic range problem refers to the fact that there are limitations to the upper rotation rate (and hence the ratio of upper rate to minimum detectable rate). The "scale factor" being discussed here is not the optical scale factor relating the Sagnac phase shift $\phi_s$ to the rotation rate $\Omega$, but an "electrical" scale factor which arises from converting the optical phase shift into an electrical signal. Such scale factor and dynamic range difficulties will be explained more fully by now referring to the conventional or "minimum configuration" fiber optic gyroscope (FOG) shown in FIG. 1 (and described by S. Ezekiel, et al. in their article, *Fiber Optic Rotation Sensors, Tutorial Review*, in Fiber Optic Rotation Sensors, published by Springer, NY (1982)).

The fiber optic gyroscope of FIG. 1 includes a first directional coupler 13 having input ports 15 and 17 and output ports 19 and 21, a second directional coupler 23 having input ports 25 and 27 and output ports 29 and 31, and a fiber optic coil 33 having opposite ends 35 and 37 respectively coupled to the output ports 29 and 31 of the coupler 23. The fiber optic coil 33 comprises N turns wound on a plan area A. In a typical application the fiber optic gyroscope of FIG. 1 is mounted on a rotating platform (not shown) with the axis of symmetry of the coil 33 parallel to the axis of rotation of the platform so that the rotation rate $\Omega$ of the platform can be sensed.

Light from an optical source 39, such as a laser or super-luminescent diode, propagates through the coupler 13 to the coupler 23, which splits the light into two substantially equal beams $I_1$ and $I_2$. The beams $I_1$ and $I_2$ respectively enter the opposite ends 35 and 37 of the fiber optic coil 33, with beam $I_1$ propagating through the coil 33 in a clockwise direction and beam $I_2$ propagating through the coil 33 in a counter-clockwise direction. After these two counter-propagating light beams $I_1$ and $I_2$ have traversed the coil 33, they reenter the coupler 23 through its output ports 31 and 29 and, upon recombining in the coupler 23, interfere with each other. This light interference is related to the rate of rotation $\Omega$ of the coil 33. For example, if the gyroscope is rotating at a rate $\Omega$, the beams $I_1$ and $I_2$ undergo a non-reciprocal Sagnac phase shift, $\phi_s$, where $$\phi_s = \frac{8\pi NA}{\lambda c} \cdot \Omega \tag{1}$$

for a source 39 of wavelength $\lambda$, where c is the velocity of light.

The combined interfering beams combine in coupler 23 and the resultant beam propagates into the coupler 13. A portion of that resultant beam is directed by the coupler 13 to a photodetector 41, where the intensity $$I = I_0 (1 + \cos \phi_{tot}) \tag{2}$$

is detected and amplified by an amplifier 43. The intensity I represents the standard interferometric "fringe" pattern for the total non-reciprocal phase shift $\phi_{tot}$, where $I_0$ is the peak ac excursion.

If nothing else perturbs the fiber optic coil 33, $\phi_{tot} = \phi_s$, and in principle this signal could be detected to determine the rotation rate. However, a practical problem is that the sensitivity of the gyroscope, $\approx \Delta I/\Delta \phi_s$, goes to zero at low rotation rates. To avoid this, a time varying phase shift or modulation is usually applied, often by winding a part of the coil 33 around a piezoelectric transducer (PZT) 45. When the PZT 45 is driven sinusoidally at a frequency $\omega$ and drive level or amplitude A by an oscillator or PZT driver 47, a non-reciprocal phase shift is added to the Sagnac phase shift, $\phi_s$:

$$\phi_{tot} = \phi_s + \eta \cos \omega t. \tag{3}$$

where $\eta = 2 \sin \omega \tau/2$ and $\tau$ is the transit time of the coil 33. As a result of the non-linear phase applied and the non-linear interferometer response of Equation (2), the output of the amplifier 43 contains an abundance of harmonics of the PZT drive frequency $\omega$ and the ideal voltage output of the amplifier 43 is given by:

$$V = I_0\{(1 + J_0(\eta)\cos\phi_s) + \alpha_1 J_1(\eta)\sin\phi_s \cos\omega t + \alpha_2 J_2(\eta)\cos\phi_s \cos 2\omega t + \ldots\} \tag{4}$$

where the $\alpha_i$'s depend on electrical bandwidth and so forth, and the $J_i$'s are Bessel functions.

The above voltage output of the amplifier 43, as shown in equation (3), is applied to a mixer circuit 49 where it is heterodyned with a portion of the output $\omega$ from the oscillator 47 to produce a voltage level $V(\omega)$ proportional to $\sin\phi_s$.

By choosing $\eta \approx 1.84$, the maximum value of $J_1(\eta)$ is obtained, and if the gyroscope output (at the output of amplifier 43) at frequency $\omega$ is detected, the voltage level at the output of the mixer 49 is $$V(\omega) = \alpha_1 I_0 J_1(\eta) \sin\phi_s \tag{5}$$

where $V(\omega)$ is a voltage amplitude which reflects the sign of $\phi_s$ and for which the sensitivity $\Delta I/\Delta\phi$ is greatest at small values of $\phi_s$. There are two types of problems associated with Equation (5).

A first problem is that the sensitivity of the gyroscope decreases as $\phi_s$ increases and actually goes to zero when $\phi_s$ reaches $\pm 90°$. In other words, because the slope of the sine function ($\sin \phi_s$) goes to zero at $\pm 90°$, small changes in the measured level of $V(\omega)$ correspond to very large changes in the imputed $\phi_s$, and thus in the imputed rotation rate. Since the fiber optic gyroscope of FIG. 1 is not reliable near or past a point where the slope of sin $\phi_s$ goes to zero ($\pm 90°$), the conventional fiber optic gyroscope is limited to a maximum Sagnac phase shift of $\pm 90°$. This restricts the maximum rotation rate to that value of $\Omega$ which corresponds to $\phi \approx 90°$ and, therefore, limits the overall "dynamic range" of the gyroscope to one-fourth of a fringe.

A second problem is that the output level, $V(\omega)$, also depends on $J_1(\eta)$. Unintentional changes in the level of $\eta$ will cause $J_1(\eta)$ to change and, hence, cause the scale factor of the gyroscope to drift. Changes in $\eta$ can occur due to amplitude drift in the oscillator 47 that drives the PZT 45. Such changes in $\eta$ can be controlled by monitoring the level of the output of the oscillator 47. To attain scale factor stability comparable to current sensitivities (in parts per million) requires an amplitude control of 0.1%. Such an output level is not difficult to control. However, the electrical drive amplitude is not the only factor which influences $\eta$. Changes in the mechanical properties of the PZT 45 with temperature, changes in how the fiber optic coil 33 loads the PZT 45, creeping in the fiber glass (not shown) on the PZT 45, relaxation of the adhesive bonds (not shown) between the coil 33 and PZT 45, and slowly changing static stresses on the PZT 45 are a few of the possible sources of error that could change $\eta$, even if the amplitude of the oscillator 47 (which drives the PZT 45) were held perfectly constant. Since some of the above mentioned sources of error can not be modelled, the scale factor stability of the gyroscope of FIG. 1 will be limited to the level of certainty to which all such error sources are identified and stabilized.

One attempt to rectify the above-described problems has been disclosed by K. Böhm, et al. in their article, *Direct Rotation-Rate Detection With a Fibre-Optic Gyro By Using Digital Data Processing*, 19 Electronics Letters 997–999 (1983). In this article, the first, second and fourth harmonics are detected by means of a 10-step digitization of the output waveform which is used to extract the three amplitudes. The first and second harmonic components are used to contruct an arctangent, while the second and fourth harmonics are used to hold $\eta$ constant. This technique is an improvement over the usual method because it does take cognizance of the fact that $\eta$ can change and it increases the dynamic range of the gyroscope by looking at both the sin $\phi_s$ and cos $\phi_s$ components. However, by virtue of the fact that this technique stabilizes $\eta$ by looking only at cos $\phi_s$ terms, this technique can not develop an accurate error signal when cos $\phi_s = 0$. In addition, the 10-step digitization process is expected to be less accurate, as well as 10 times slower, than a technique in which $V(\omega)$ or $V(2\omega)$ are first processed as analog signals and then digitized.

OBJECTS OF THE INVENTION

One object of the invention is to provide an improved fiber optic gyroscope.

Another object of the invention is to provide a state-switching fiber optic gyroscope.

Another object of the invention is to provide a fiber optic gyroscope which has a much larger dynamic range of operation over the usual fiber optic gyroscopes.

Another object of the invention is to provide a fiber optic gyroscope which reduces the scale factor and dynamic range problems associated with the well-known "minimum configuration" fiber optic gyroscope.

Another object of the invention is to provide a fiber optic gyroscope which automatically switches the state of the gyroscope between two states as a function of the rotation rate of the gyroscope in order to keep the sensitivity and accuracy of the gyroscope high for rotation rate sensing while allowing the stabilization of the drive level.

Another object of the invention is to provide a state-switching fiber optic gyroscope which always uses the more sensitive voltage for sensing the rotation rate at the same time it uses the potentially higher amplitude voltage as a feedback signal to stabilize the drive level.

Another object of the invention is to provide a multi-state fiber optic gyroscope which automatically selects any of a plurality of states as a function of the rotation rate.

A further object of the invention is to provide a two-state fiber optic gyroscope which, during each of the two-state operations, provides a peak-to-peak detection of the detected signal for normalizing the rotation rate sensing signal at the same time that the drive level is such as to cause $\eta$ in Equation (3) to be greater than $\pi$.

SUMMARY OF THE INVENTION

These and other objects are achieved in the present invention by providing an improved fiber optic gyroscope which comprises: means for demodulating the detected output of the gyroscope to yield $V(\omega)$ and $V(2\omega)$ voltage levels respectively proportional to the sin $\phi_s$ and cos $\phi_s$ of that detected output; and a logic system for switching a switching network during a first state or mode to pass $V(2\omega)$ as a feedback signal to a feedback loop to stabilize the drive level of a piezoelectric transducer (PZT) (or any other transducer) at a first predetermined amplitude and to pass $V(\omega)$ as a rate sense signal into a rotation rate detection system to sense the rotation rate, and during a second state or mode to pass $V(\omega)$ as the feedback signal to the feedback loop to stabilize the drive level of the PZT at a second predetermined amplitude and to pass $V(2\omega)$ as the rate sense signal into the rotation rate detection system to sense the rotation rate. The rate sense signal being used at any given time is normalized by the output of a peak-to-peak detector and decoded in the logic system to provide the least significant bits (LSB) of the rotation rate. The LSB represent an angle of Sagnac phase shift between approximately $-45°$ and $+45°$. In addition, each time that the rate sense signal exceeds a preselected absolute value, the logic system switches the switching network to change from one state to the other state, and also increments (or decrements) in the logic system the most significant bits (MSB) of the rotation rate by a number corresponding to a Sagnac phase shift of 90°. The total rotation rate at any given time corresponds to the arithmetic sum of the LSB and MSB.

BRIEF DESCRIPTION OF THE DRAWING

These and other objects, features and advantages of the invention, as well as the invention itself, will become better understood by reference to the following detailed description when considered in connection with the accompanying drawings wherein like reference numerals designate identical or corresponding parts throughout the several views, and wherein:

FIG. 5 is a TABLE useful in explaining the operation of the invention.

DETAILED DESCRIPTION OF THE PREFERRED EMBODIMENT

In essence, the present invention performs two important operations. In a first operation, the FOG of the invention looks at both sine and cosine terms in the Bessel series expansion shown in Equation (4). This keeps the sensitivty and accuracy high while allowing the stabilization of $\eta$, the drive level. In a second operation, the FOG of the invention normalizes the interferometer signal V, as shown in Equation (4), in a way which takes account of all the perturbations acting on $I_o$ by directly sampling their effects.

Figure 4:
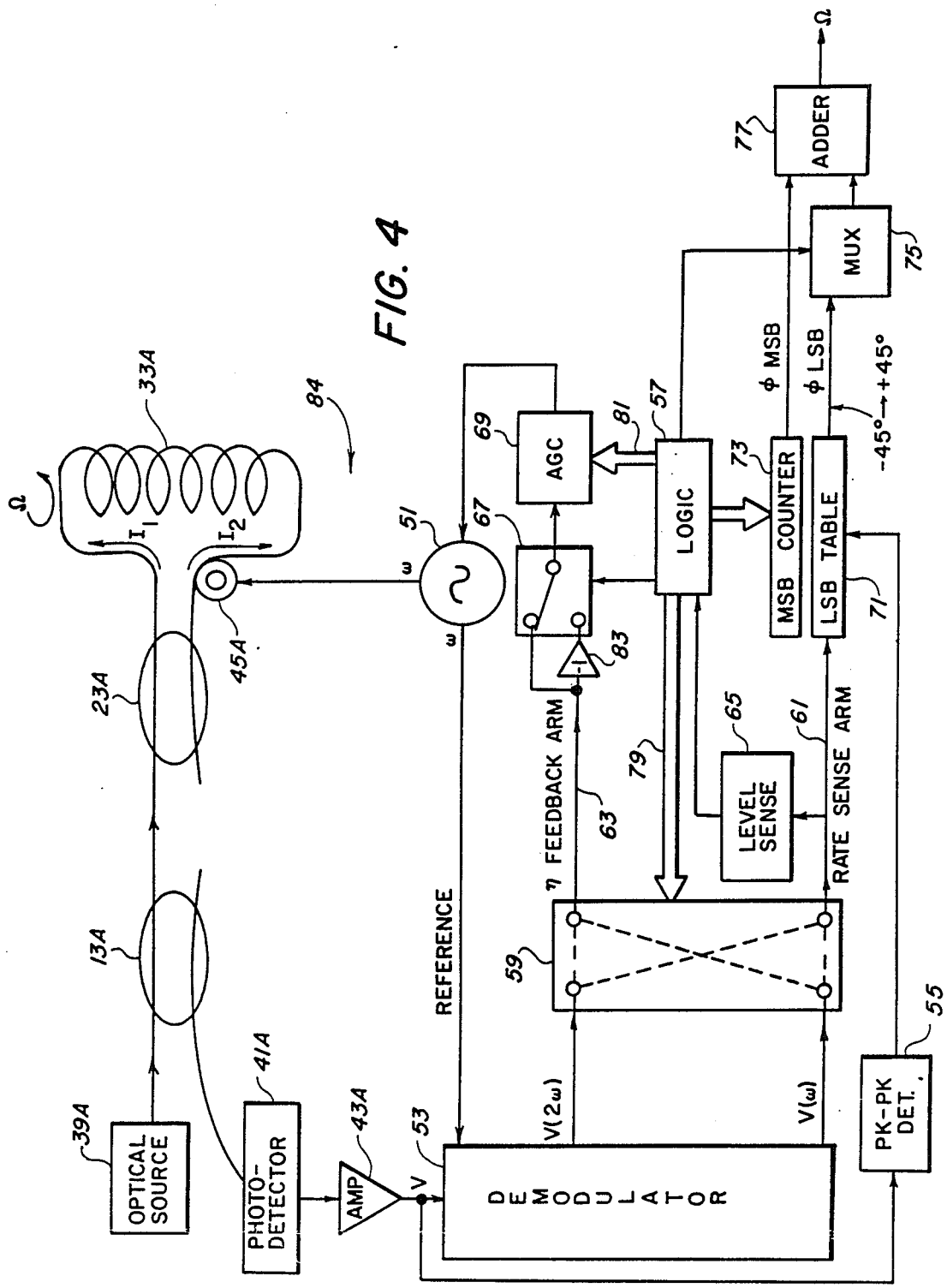
FIG. 4 is a schematic block diagram of a preferred embodiment of the invention.

Before the schematic block diagram of the preferred embodiment of the FOG invention of FIG. 4 is discussed, it should aid in understanding the invention to first examine the basic concepts involved in the invention.

Figure 2:
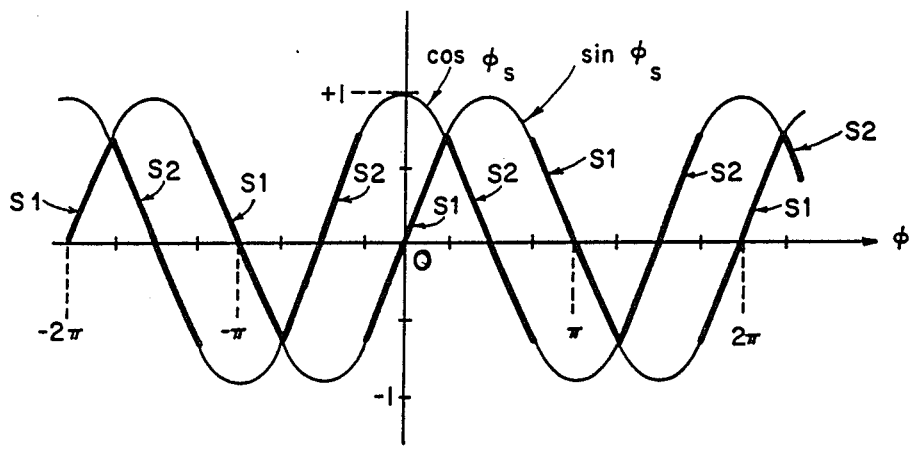
FIG. 2 shows ideal response curves for a two-state gyroscope.

As for the above-mentioned first operation, FIG. 2 shows sin $\phi_s$ and cos $\phi_s$ curves that ideally could be used in a two-state fiber optic gyroscope. One (or more) of the odd harmonics in Equation (4) is processed (to be explained) to yield an essentially DC voltage V ($\omega$) that is to sin $\phi_s$, while one (or more) of the even harmonics in Equation (4) is processed (to be explained) to yield an essentially DC voltage V($2\omega$) that is proportional to cos $\phi_s$. As will be explained in relation to FIG. 4, one of these V($\omega$) and V($2\omega$) voltages will be sensed, as a function of the rotation rate, in order to automatically determine the rotation rate. However, for the sake of clarity, only the sin $\phi_s$ and cos $\phi_s$ curves of FIG. 2 will be discussed at this time.

At low rotation rates of the platform, where the Sagnac phase shift $\phi_s$ of the gyroscope is between approximately $-45°$ and $+45°$ ($-\pi/4$ to $+\pi/4$ radians), the sin $\phi_s$ curve is used to determine the rotation rate $\Omega$ of the platform since it has the greater slope of the two curves and thus the greatest accuracy between those limits of $\phi_s$. The gyroscope will be said to be in a STATE 1 (S1) mode of operation when the sin $\phi_s$ curve is being used to determine the rotation rate. The gyroscope remains in STATE 1 as long as $\phi_s$ is between $-\pi/4$ and $+\pi/4$. Between these limits the gyroscope essentially behaves exactly like a conventional FOG does in determining the rotation rate.

If the rotation rate were to increase the Sagnac phase shift 100 $_s$ to an angle greater than $+45°$ (or $+\pi/4$), the gyroscope would switch to the cos $\phi_s$ curve and use that cos $\phi_s$ curve to determine the rotation rate. The gyroscope will be said to be in a STATE 2 (S2) mode of operation when the cos $\phi_s$ curve is being used to determine the rotation rate. The gyroscope remains in STATE 2 as long as $\phi_s$ is between $+\pi/4$ and $+3\pi/4$. As shown in FIG. 2, the cos $\phi_s$ curve has the greatest slope, and hence the greatest accuracy, when $\phi_s$ is between $=+\pi/4$ and $+3\pi/4$.

If the rotation rate continues to increase, then every additional increase of $\pi/2$ in the Sagnac phase shift $\phi_s$ will cause another switch in STATES. Thus, the gyroscope would switch from STATE 1 to STATE 2 when $\phi=\pi/4$, from STATE 2 back to STATE 1 when $\phi=3\pi/4$, from STATE 1 back to STATE 2 when $0=5\pi/4$, from STATE 2 back to STATE 1 when $\phi=7\pi/4$, from STATE 1 back to STATE 2 when $\phi=9\pi/4$, and so forth. High rotation rates above a $\phi_s=0°$ would be sensed by counting (in increments of 90° or $\pi/2$) the number of times that the STATES 1 and 2 are switched. As shown in FIG. 2, the gyroscope would be in STATE 1 when $\phi_s$ is between $-\pi/4$ and $\pi/4$, in STATE 2 when $\phi_s$ is between $\pi/4$ and $3\pi/4$, in STATE 1 when $\phi_s$ is between $3\pi/4$ and $5\pi/4$, in STATE 2 when $\phi_s$ is between $5\pi/4$, and $7\pi/4$, in STATE 1 when $\phi_s$ is between $7\pi/4$ and $9\pi/4$, and so on. Note that the heavy lines of the above-defined portions of the sin $\phi_s$ and cos $\phi_s$ curves of FIG. 2 correspond to the greatest sensitivity of those curves when used in a gyroscope to sense the rotation rate of the platform.

Figure 1:
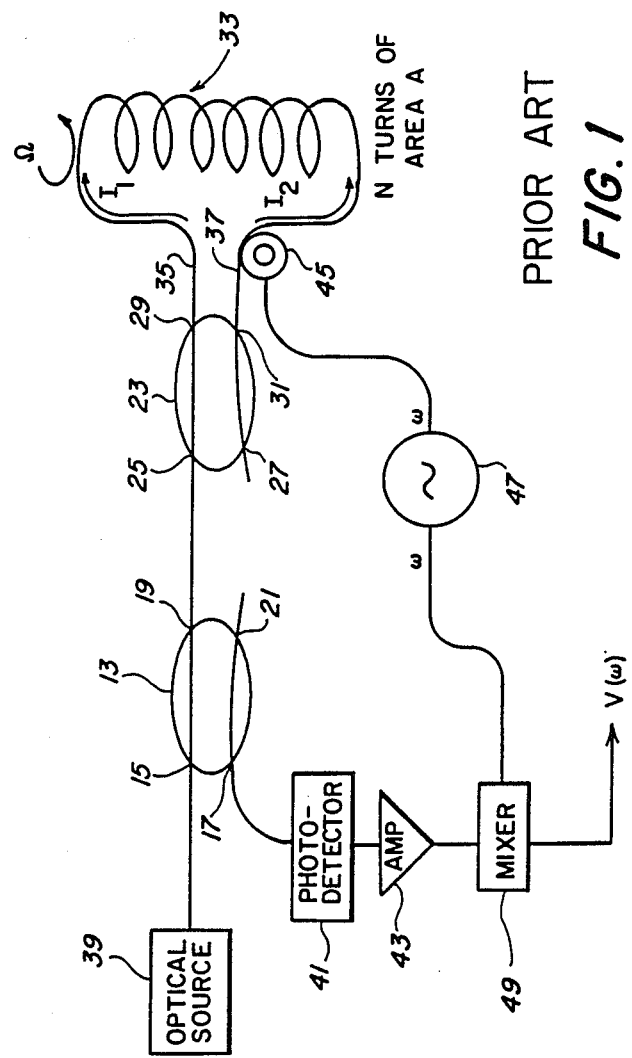
FIG. 1 is a schematic block diagram of a prior art fiber optic gyroscope.

Such an operation of the gyroscope of the invention would provide the accuracy of the conventional FOG of FIG. 1 over a relatively wide range of $\phi_s$ angles since, as shown in FIG. 2, $\phi_s$ would effectively be translated (during each of the STATES 1 and 2) into a range between $-\pi/4$ and $\pi/4$ while the number of times that the STATE of the gyroscope is being switched is being counted. This procedure can continue until the magnitude of the Sagnac phase shift $\phi_s$ becomes comparable to the phase coherence of the light source being used. However, even for a low coherence super-luminescent diode source, the above-described technique of counting the STATE switchings could extend the dynamic range of the gyroscope of the invention by two orders of magnitude over the conventional FOG of FIG. 1.

In the above discussion it was assumed that the sin $\phi_s$ and cos $\phi_s$ curves of FIG. 2 are well behaved. However, in actual operation there are unavoidable deviations from such ideal curves. For instance, the coherence of the light source being used will make the sin $\phi_s$ and cos $\phi_s$ curves in FIG. 2 damp out over a characteristic phase difference of $\phi=2\pi L_{coh}/\lambda$, where $L_{coh}$ is the coherence length and $\lambda$ is the wave length of the light source. The damped curves will result in ever increasing errors in the computed rates for the conventional FOG of FIG. 1. To avoid these errors, a normalization operation must be introduced to effectively divide Equation (4) by $I_o$ to compensate for any changes in the amplitude of $I_o$.

This normalization operation is the second important operation performed by the present invention and will be explained more fully in relation to FIG. 4. This normalization operation departs from the usual practice in a conventional FOG, such as the one shown in FIG. 1, of driving the modulator 45 at the $\eta$ corresponding to the maximum of $J_1$. Instead, the normalization operation of the present invention drives the PZT 45A (FIG. 4) to create an amplitude of $\eta$ greater than $\pi(=3.14)$. By equation (4), this assures an excursion over more than an entire fringe and, thus, $I_0$ can be measured directly by finding the peak-to-peak voltage of the waveform. Thus, by finding the peak-to-peak voltage of the waveform, all of the factors which contribute to changes in $I_o$ can be sampled and measured.

However, correcting for changes in $I_o$ in the above-described manner introduces a possible error source in the drive level or $J_i(\eta)$. In the conventional FOG of FIG. 1 this drive level error is minimized, since driving at the peak of $J_1(\eta)$ makes the FOG vulnerable to changes in $\eta$ only in the second order. In contrast, over-driving the PZT 45A (FIG. 4) permits varitions in $\eta$ to affect the output drive level in the first order. A solution to this problem lies in driving the modulator either at the zero of $J_2$ (when in STATE 1 and sampling $J_1 \sin \phi_s$) or at the zero of $J_1$ (when in STATE 2 and sampling $J_2 \cos \phi_s$). Thus, in STATE 1, $J_1 \sin \phi_s$ is used to find the rotation rate, while $J_2 \cos \phi_s$ is used to provide an error signal to establish the level of $\eta$ which corresponds to the zero of $J_2$. Similarly, in STATE 2, $J_2 \cos \phi_s$ is used to find the rotation rate, while $J_1 \sin \phi_s$ is used to provide an error signal to establish the level of $\eta$ which corresponds to the zero of $J_1$. In both cases above, the output (although dependent on changes in $\eta$ in first order) is stabilized by means of a readily derived error signal fed to an appropriate servo loop.

Figure 3:
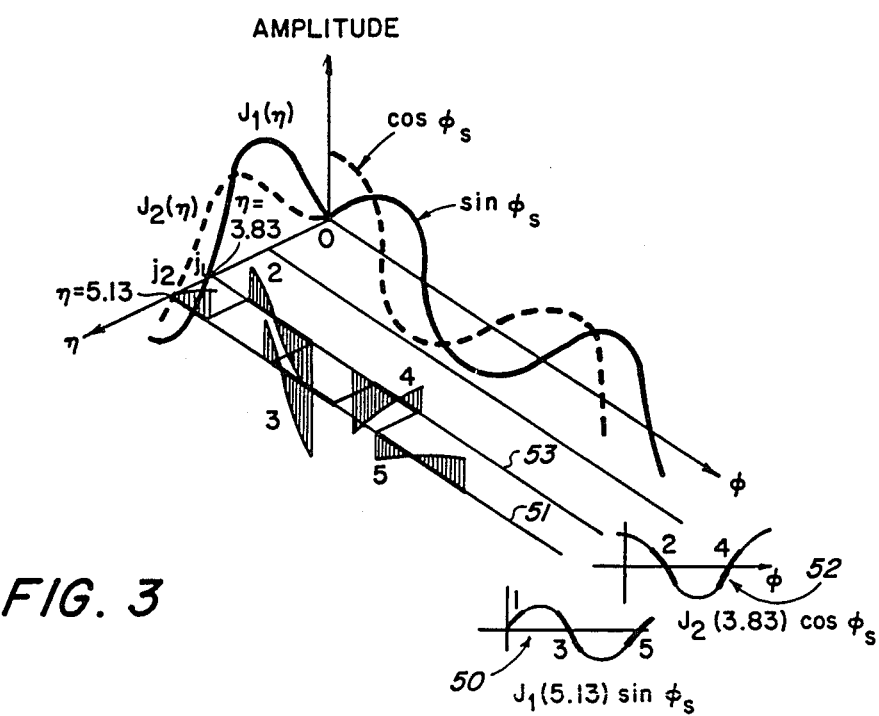
FIG. 3 illustrates response curves useful in explaining the invention.

The above-discussed operation of the gyroscope of the invention is basically illustrated in FIG. 3, which plots the amplitude of the output voltage against each of $\phi_s$ and $\eta$. As the Sagnac phase shift $\phi_s$ increases from zero (during STATE 1), the modulation is driven at the zero of $J_2$ (i.e. j2), so that the $\sin \phi_s$ term can be sensed and the proper angle between $-\pi/4$ and $\pi/4$ can be determined. When the Sagnac phase shift $\phi_s$ increases past $\pi/4$ a switch is made to STATE 2, the modulation level is changed so as to be driven at the zero of $J_1$ (i.e. j1), the $\cos \phi_s$ term is sensed and the proper phase shift determined. As the STATES 1 and 2 are switched back and forth, provision is made to count the number of switchings and $\pi/2$ multiples of $\phi_s$ are arithmetically added to the proper angle along one of the lines 51 and 53 to determine the rotation rate.

Note from FIG. 3 that $\eta \cong 5.13$ at j2, and that $\eta \cong 3.83$ at j1. The $\sin \phi_s$ segments 1, 3 and 5 along the line 51 which intersects the $\eta$ axis at j2 are shown in the inset curve 50. Similarly, the $\cos \phi_s$ segments 2 and 4 along the line 53 which intersects the $\eta$ axis at j1 are shown in the inset curve 52.

The preferred embodiment of the invention will be explained by now referring to the improved fiber optic gyroscope shown in FIG. 4 and to the TABLE of FIG. 5.

The fiber optic gyroscope (FOG) of FIG. 4 includes directional couplers 13A and 23A, a fiber optic coil 33A, an optical source 39A, a photodetector 41A, an amplifier 43A and a piezoelectric transducer (PZT) 45A, which are respectively similar to the elements 13, 23, 33, 39, 41, 43 and 45 of FIG. 1 in both structure and operation. Hence, the elements 13A, 23A, 33A, 39A, 41A, 43A and 45A of FIG. 4 require no further explanation.

An oscillator or PZT driver 51 drives the PZT 45A sinusoidally at a frequency $\omega$ and PZT drive level or amplitude so as to add a non-reciprocal phase shift to the Sagnac phase shift $\phi$, as discussed in relation to FIG. 1. A portion of the output of the oscillator 51 is also applied as a reference signal to a demodulator 53.

The amplified signal V at the output of the amplifier 43A is sent to the demodulator 53 and to a peak-to-peak detector (PK-PK DET) 55. It will be recalled that this output signal V is given by Equation (4). Demodulator 53, which can be comprised of mixing and filtering circuits (not shown), detects and extracts from the signal V the essentially DC values $V(\omega)$ and $V(2\omega)$, which respectively correspond to the fundamental and second harmonic amplitudes contained in Equation (4). As shown in Equation (4).

$$V(\omega) = \alpha_1 I_0 J_1(\eta) \sin \phi_s \quad (5a)$$

and $$V(2\omega) = \alpha_2 I_0 J_2(\eta) \cos \phi_s \quad (5b)$$

These two levels, $V(\omega)$ and $V(2\omega)$, are used to put the gyroscope into either STATE 1 or STATE 2 as a function of the Sagnac phase shift $\phi_s$. In each of STATES 1 and 2, one of the levels $V(\omega)$ and $V(2\omega)$ is used to provide a feedback level which forces the PZT 45A to be driven at an appropriate associated drive level or amplitude (to be explained), while the other one of the two levels is used to sense the rotation rate by providing an equivalent measure of the Sagnac phase shift $\phi_s$ between $-\pi/4$ and $+\pi/4$. This measure of the Sagnac phase shift $\phi_s$, in conjunction with the output of the peak-to-peak detector 55, is used to construct the least significant bits (LSB) of the rotation rate $\Omega$. The most significant bits (MSB) of the rotation rate are provided by a logic circuit 57, which is also used to drive the gyroscope into one of the two STATES 1 and 2. This logic circuit 57 can be a computer or a microprocessor.

The operation of the FOG of FIG. 4 in each of the STATE 1 and STATE 2 modes of operation can best be understood by tracking the operation of the FOG as the input rotation rate is increased from zero.

$$-45° < \phi_s < +45°$$

At low rotation rates of the platform, where the Sagnac phase shift $\phi_s$ of the FOG is between $-45°$ and $+45°$, the FOG is in STATE 1. Assume that $\phi_s$ is increasing from 0°.

When the FOG is in STATE 1, an electronic switching network 59 passes the $V(\omega)$ level (which corresponds to $\sin \phi_s$) to a rate sense arm 61 and the $V(2\omega)$ level (which corresponds to $\cos \phi_s$) to an $\eta$ feedback arm 63. As Equation (5a) shows, the $V(\omega)$ level on arm 61 is low because $\phi_s$ is small at low rotation rates. As long as $V(\omega)$ remains low, a level sense circuit 65 will output a signal to instruct the logic circuit 57 to maintain the FOG in STATE 1.

The $V(2\omega)$ level on the $\eta$ feedback arm 63 is passed through an electronic switch 67 to an automatic gain control (AGC) circuit 69 which has its output coupled to the oscillator or PZT driver 51. The AGC circuit 69 is controlled by signals from the logic circuit 57 to force the oscillator 51 to develop its output signal amplitude to cause a preselected drive level $\eta$ during STATE 1.

In contrast to the conventional FOG of FIG. 1, during STATE 1 the drive level $\eta$ is chosen to be approximately 5.13 (rather than 1.84). This 5.13 value of $\eta$ is commonly referred to as j2 or the zero of $J_2$: $J_2(5.13) = 0$. Driving the PZT 45A at $\eta = j2$ is disadvantageous in that it reduces the overall system gain (compared to the FOG of FIG. 1), since $J_1(1.84) = 0.58$ while $J_1(5.13) = 0.34$. However, there is an advantage in stability that is offered by driving the gyroscope at this particular value of $\eta$. Any small drift in $\eta$ away from j2 will be amplified by the electronics in a feedback network 84 which then provides a signed error signal to the AGC circuit 69 to return the output amplitude of the oscillator 51 back to a level to cause $\eta$ to be 5.13. More particularly, if the amplitude of $\eta$ is such that the $V(2\omega)$ level from the demodulator 53 is not zero, the high open loop gain in the feedback network 84 will alter the amplitude of the PZT driver 51 until a zero output of $V(2\omega)$ is obtained. The feedback network 84 is comprised of the oscillator 51, transducer 45A, coil 33A, couplers 23A and 13A, photodetector 41A, amplifier 43A, demodulator 53, switching network 59, inverter 83, electronic switch 67 and AGC circuit 69.

As shown in Equation (5b), the zero output of V(2ω) can be due only to the level η and not to $\phi_s$, since cos $\phi_s$ is almost equal to 1 for small rotation rates. As a consequence, the amplitude η is held fixed by the above-described feedback network which holds V(2ω)=0 until $\phi_s$ changes to ≈±45°.

The V(ω) level on the rate sense arm 61 and the peak-to-peak voltage ($2I_o$ of Equation (4) of the signal V from the peak-to-peak detector 55 are both applied to a LSB (least significant bits) table or generator 71. The table 71 can be a table lookup or arcsine calculator. Table 71 normalizes the V(ω) level by dividing it by the peak-to-peak voltage. Then the resultant normalized V(ω) level, which is an arcsine function, is decoded by the table 71 to form or construct the least significant bits (LSB) in the digital rotation rate word representing Ω. Note that the arcsine function is most accurate in this range between −45° and +45°, and that the sensitvity of the gyroscope is only degraded to 0.707 of its most sensitive value at the extreme limits of ±45°.

At this time the most significant bits (MSB) of the rotation rate word representing Ω are zero. The MSB of the rotation rate word are stored in a MSB (most significant bits) counter or register 73, which outputs a zero at this time. The digital LSB output ($\phi_{LSB}$) of the LSB table 71 is passed through an electronic multiplexer unit (MUX) 75 to an adder 77, which arithmetically sums that digital LSB output $\phi_{LSB}$ with the digital MSB output $\phi_{MSB}$ of the MSB counter 73 to produce the rotation rate word Ω. The MUX 75 has the logical capability of inverting the sign of the digital output $\phi_{LSB}$.

$$+45° < \phi_s < 135+°$$

Now assume that the rotation rate has increased such that $\phi_s > 45°$. As $\phi_s$ increases, so does V(ω) which corresponds to sin $\phi_s$. When $\phi_s=45°$, the amplitude of V(ω) is sufficiently high to cross a preselected threshold set by the level sense circuit 65. In response to this sensed amplitude of V(ω), the level sense circuit 65 outputs a signal to instruct the logic circuit 57 to change the gyroscope of FIG. 4 from STATE 1 to STATE 2. Upon receiving this signal from the level sense circuit 65, the logic circuit 57 sends control signals over a bus 79 to cause the switching network 59 to switch the roles of V(ω) and V(2ω). As a result, V(2ω) (which corresponds to cos $\phi_s$) is now applied to the rate sense arm 61, while V(ω) (which corresponds to $\phi_s$) is now applied to the η feedback arm 63. The logic circuit 57 also sends control signals over a bus 81 to cause the AGC circuit 69 to approximate a new correct-driving level which forces the modulator 51 to develop its output amplitude at or near a second preselected drive level such as to produce η=j$_1$ for STATE 2. In addition, the logic circuit 57 increments the count of the MSB counter 73 by a digital word corresponding to 90°, since the STATE of the gyroscope has been changed. If necessary, the logic circuit 57 also sends a signal to the switching circuit 67 to cause the logic sign or polarity of the voltage level on the η feedback arm 63 to be inverted by inverter 83 in order to apply negative feedback to the AGC circuit 69. Finally, the logic circuit 57 sends a signal to the MUX 75 to enable the $\phi_{LSB}$ from table 71 to be logically inverted and passed to the adder 77.

Such a need for changing the sign of $\phi_{LSB}$, when $\phi_s$ is between +45° and +135°, can be realized by referring to FIG. 5. When $\phi_s$, is between −45° and +45°, $\phi_{LSB}$ is between −45° and +45°, $\phi_{MSB}=0$, and the rate word Ω is simply equal to $\phi_{LSB}$. However, when $\phi_s$ is between +45° and +135°, $\phi_{LSB}$ is between +45° and −45°, respectively (as implicitly shown in FIG. 2) and $\phi_{MSB}=90°$. At this time assume $\phi_s=53°$. Since V(2ω) (which is now on the rate sense arm 61) corresponds to cos $\phi_s$ (or cos 53°) and table 71 is an arcsine calculator, the arcsine of cos 53° will produce a $\phi_{LSB}$ angle=37°. This 37° degree $\phi_{LSB}$ angle must be subtracted from the $\phi_{MSB}$ angle of 90° to produce a rotation rate$\phi$ corresponding to 53°. Thus, the logic sign of $\phi_{LSB}$ must be changed when $\phi_s$ is between +45° and +135°.

During STATE 2, the drive level η of the ω output from the oscillator 51 is chosen to be ≈3.83. This 3.83 value of η is commonly called j$_1$ and is the zero of J$_1$, such that J$_1$(j$_1$)=0. In other words, as shown in FIG. 3, j$_1$ is the value of η such that J$_1$(η)=0 when η=j$_1$. The value of η is changed to j$_1$ in STATE 2 in order to obtain an appropriate error signal in the feedback network 84. If η deviates from j$_1$, the non-zero value of V(ω) on the η feedback arm 63 will cause the elements in the feedback network 84 to force a change in the amplitude of the oscillator or PZT driver 51 until the null at V(ω) is found.

$$\phi_s > +135°$$

When $\phi_s > 135°$, the FOG of FIG. 4 reverts to STATE 1, the MSB counter 73 is again incremented by 90° to hold a digital MSB number (representing $\phi_{MSB}$) corresponding to an angle of 180°, V(ω) and V(2ω) again switch roles with V(ω) being passed to the rate sense arm 61 and V(2ω) being passed to the η feedback arm 63, the AGC circuit 69 is controlled by the logic circuit 57 to drive the PZT driver 51 to develop a drive level η=j$_2$, the multiplexer 75 is controlled by logic circuit 57 to pass the logical inversion of $\phi_{LSB}$ to adder 77 (as indicated in the TABLE of FIG. 5). In addition, because of the sign change in cos $\phi_s$, the feedback signal of V(2ω) on the feedback arm 63 must also change sign. As mentioned before, the logic circuit 57 controls this sign change of the feedback signal on the arm 63 by enabling the electronic switch 67 to pass the inversion of the feedback from the output of inverter 83 to the AGC circuit 69.

As the rotation rate continues to increase and cause $\phi_s$ to increase, the gyroscope switches from STATE 1 to STATE 2 and back again, as discussed before for other rotation rates. If the rotation rate were decreased, the gyroscope would similarly switch between the STATES 1 and 2, but would decrement the MSB counter 73 each time the STATE changed as the rotation rate decreased.

The TABLE of FIG. 5 shows other ranges of $\phi_s$, with the associated ranges and the logic signs of $\phi_{LSB}$ (applied to MUX 75) during STATES 1 and 2, the feedback logic signs applied to the electronic switch 67, and the values of $\phi_{MSB}$ and values of the rate word (Ω). The operation of the gyroscope of FIG. 4 over other ranges of $\phi_s$ can be readily be determined with the use of the TABLE of FIG. 5, the response curves of FIG. 3 and the operation of the gyroscope over the ranges previously explained.

Therefore, what has been described is an improved fiber optic gyroscope with a substantial improvement in dynamic range and scale factor stability over a basic fiber optic gyroscope. The improved fiber optic gyroscope automatically switches the state of the gyroscope between two states as a function of the rotation rate in order to keep the sensitivity and accuracy high for rotation rate sensing while stabilizing the drive level $\eta$ at a level above pi during each state.

It should therefore readily be understood that many modifications and variations of the present invention are possible within the purview of the claimed invention. It is therefore to be understood that, within the scope of the appended claims, the invention may be practiced otherwise than as specifically described.

What is claimed:

1. A fiber optic gyroscope system comprising:
   a fiber optic coil for counterpropagating substantially equal intensity first and second beams therethrough to develop first and second output beams with a relative Sagnac phase shift therebetween;
   means coupled to said fiber optic coil being responsive to a drive signal for providing a modulation to phase shift the Sagnac phase shift between said first and second output beams;
   an optical source for producing an input beam;
   directional coupler means responsive to the input beam for providing said substantially equal intensity first and second beams for counterpropagation through said fiber optic coil, said directional coupler means also combining said first and second output beams to cause a resultant interference pattern to be developed;
   photodetection means responsive to said resultant interference pattern for developing a detected signal indicative of the intensity of said resultant interference pattern;
   means for demodulating said detected signal to develop first and second voltage levels respectively proportional to sine and cosine components of said detected signal;
   feedback means responsive to said second signal during a first state for providing a first stabilized drive signal to said providing means and being further responsive to said first signal during a second state for providing a second stabilized drive signal to said providing means;
   rate sensing means responsive to the most sensitive portion of said first signal during said first state and to the most sensitive portion of said second signal during said second state to accurately sense the rotation rate;
   logic means coupled to said demodulator means and to said rate sensing means for selectively changing the state of the gyroscope between state 1 and state 2 as a function of the rotation rate in order to provide the more sensitive and accurate one of said first and second voltage levels to said rate sensing means for sensing the rotation rate and in order to provide the higher amplitude of the second and first voltage levels to said feedback means to stabilize the drive signal being applied to said providing means.

2. The system of claim 1 wherein said logic means comprises:
   switching means responsive to a first control signal for respectively passing the second and first voltage levels to said feedback means and said rate sensing means, and being further responsive to a second control signal for respectively passing the first and second voltage levels to said feedback means and said rate sensing means;
   level sensing means coupled to said rate sensing means for generating a threshold signal whenever the amplitude of that one of said first and second threshold levels being applied to said rate sensing means exceeds a predetermined threshold level; and
   a logic circuit coupled to said level sensing means being responsive to each threshold signal for changing the state of the gyroscope from one of the states 1 and 2 to the other and for alternatively generating one of the first and second control signals each time that a threshold signal is generated.

3. The system of claim 2 wherein said feedback means comprises:
   an oscillator for providing said drive signal to said providing means;
   automatic gain control means responsive to the second signal from said switching means and to a first amplitude signal from said logic means for developing a first stabilized drive signal during said first state and being further responsive to the first signal from said switching means and to a second amplitude signal from said logic means for developing a second stabilized drive signal during said second state.

4. The system of claim 2 wherein said rate sensing means comprises:
   first means responsive to that one of the first and second signals being applied thereto for developing a least significant bit number between $-45°$ and $+45°$;
   second means for incrementing its count by 90° each time that said logic means changes states in order to develop a most significant bit number; and
   means responsive to a logic sign signal from said logic means and to said least and most significant bit numbers for developing a number representative of the rotation rate.

5. The system of claim 4 wherein said feedback means comprises:
   an oscillator for providing said drive signal to said providing means;
   automatic gain control means responsive to the second signal from said switching means and to a first amplitude signal from said logic means for developing a first stabilized drive signal during said first state and being further responsive to the first signal from said switching means and to a second amplitude signal from said logic means for developing a second stabilized drive signal during said second state.

6. The system of claim 1 wherein the amplitude of said modulation to phase shift the Sagnac phase shift between said first and second output beams is greater than $\pi$.

7. The system of claim 4 wherein the amplitude of said modulation to phase shift the Sagnac phase shift between said first and second output beams is greater than $\pi$.

8. The system of claim 7 further including:
   means responsive to said detected signal from said photodetection means for developing a peak-to-peak signal therefrom;
   said first means normalizing that one of the first and second signals being applied thereto by dividing that signal by said peak-to-peak voltage and then utilizing that normalized one of the first and second signals being applied thereto to develop said least significant bit number between $-45°$ and $+45°$.

* * * * *